United States Patent [19]

Ballu

[11] Patent Number: 5,222,614
[45] Date of Patent: Jun. 29, 1993

[54] APPARATUS FOR TREATING SOIL OR VEGETATION, COMPRISING A BOOM WHICH CAN PIVOT IN RELATION TO LONGITUDINAL AND TRANSVERSE AXES

[75] Inventor: Patrick J. Ballu, Reims, France
[73] Assignee: Tecnoma, Epernay, France
[21] Appl. No.: 814,893
[22] Filed: Dec. 31, 1991

[30] Foreign Application Priority Data

Jan. 4, 1991 [FR] France .............. 91 00079

[51] Int. Cl.⁵ ................................ B05B 1/20
[52] U.S. Cl. .................. 212/266; 239/172; 239/175
[58] Field of Search ............... 212/266, 267, 268, 269; 239/159, 168, 169, 172, 175

[56] References Cited

U.S. PATENT DOCUMENTS

| | | |
|---|---|---|
| 2,770,493 | 11/1956 | Fieber . |
| 4,138,063 | 2/1979 | Batts . |
| 4,561,591 | 12/1985 | Ballu . |
| 4,598,830 | 7/1986 | Fletcher .............. 212/266 |
| 4,834,249 | 5/1989 | Dahl .................. 212/266 |
| 4,998,025 | 3/1991 | Watanabe . |

FOREIGN PATENT DOCUMENTS 343547 11/1989 European Pat. Off. .
2559686 8/1985 France .

Primary Examiner—Jesus D. Sotelo
Assistant Examiner—Stephen P. Avila
Attorney, Agent, or Firm—Watson, Cole, Grindle & Watson

[57] ABSTRACT

A carrier vehicle is solidly connected to a stationary support frame (2) which carries, by pivot joints or of a ball joint (3), a movable support frame (1) obliged to pivot only about a transverse axis relative to the direction of the travel of the vehicle and, optionally, a vertical axis. The movable support frame (1) carries a treatment boom of a suspension, for example of the swinging or rocker link type, acting in a transverse plane. The center of gravity of the assembly that includes the movable support frame and the boom is maintained on a vertical line passing through the pivot joint or the ball joint (3) or in a plane passing through the transverse axis and containing the resultant of the gravitational and inertial forces which are exerted on this assembly.

9 Claims, 5 Drawing Sheets

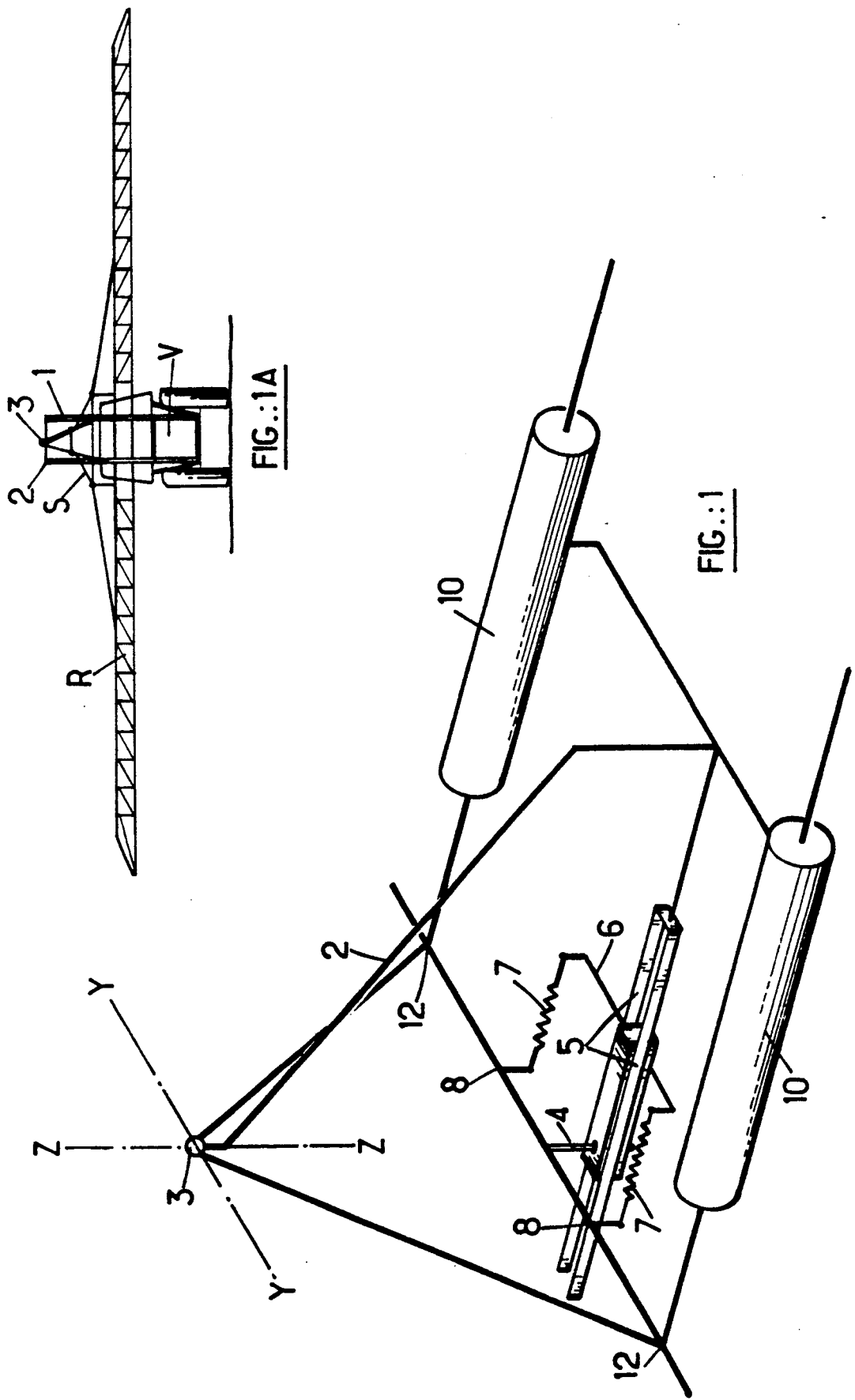

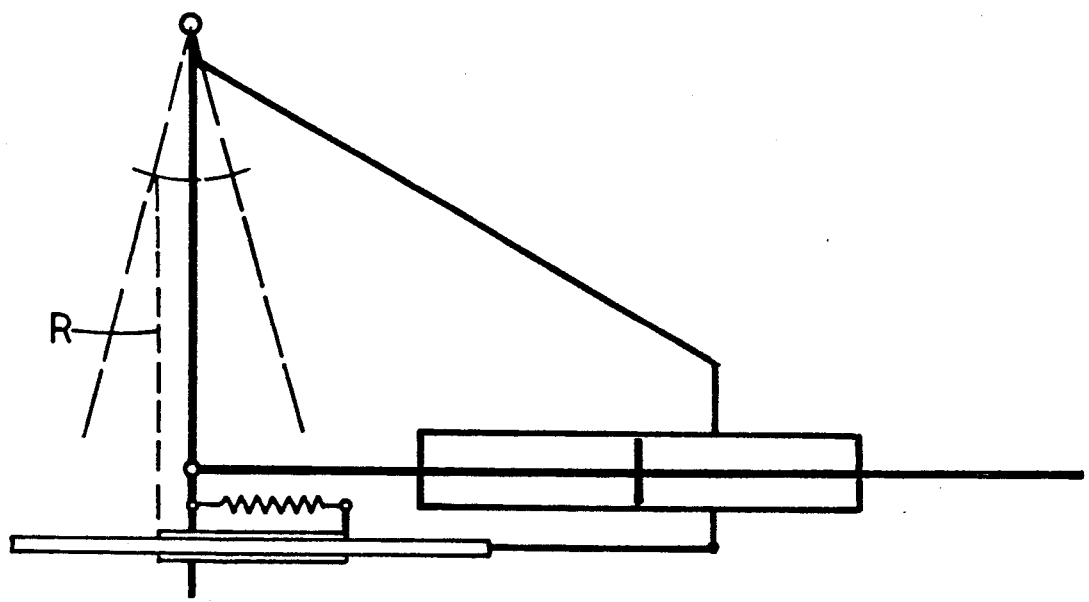
FIG.:2
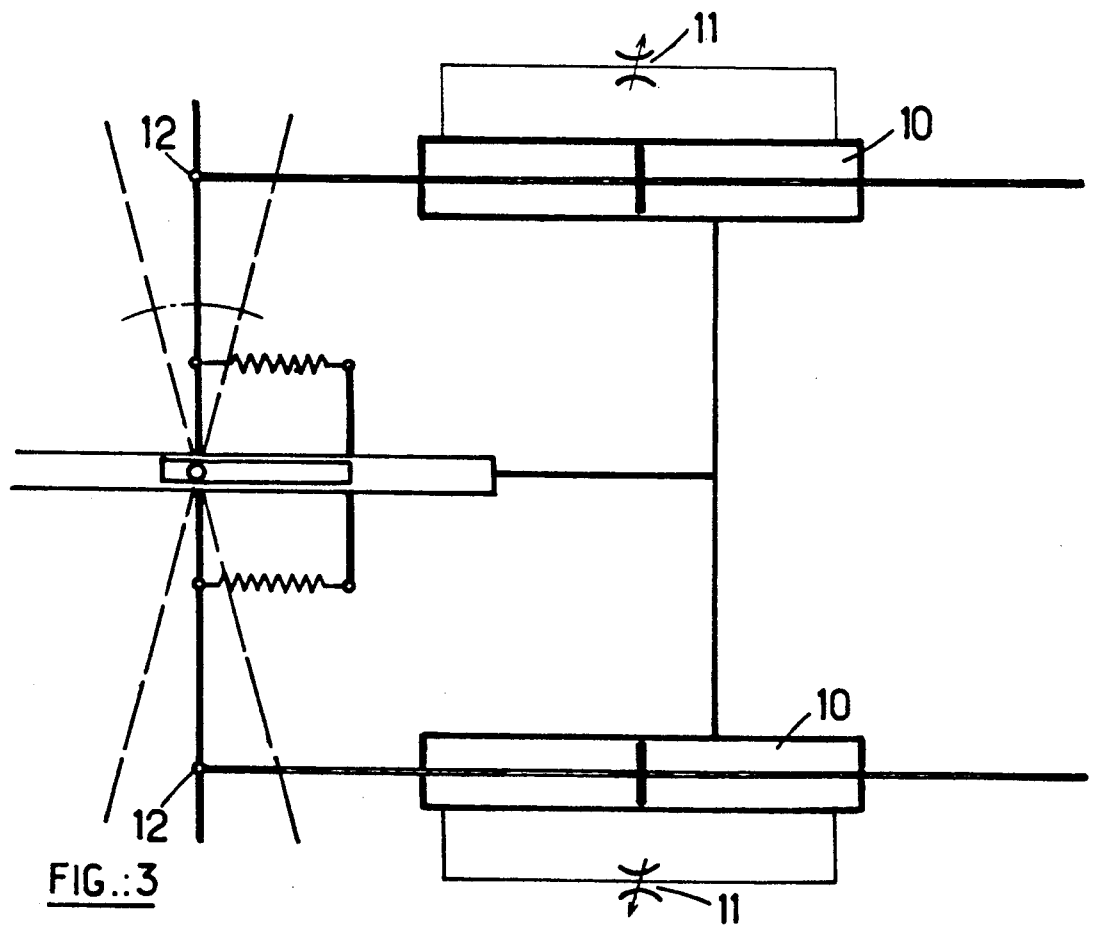
FIG.:3

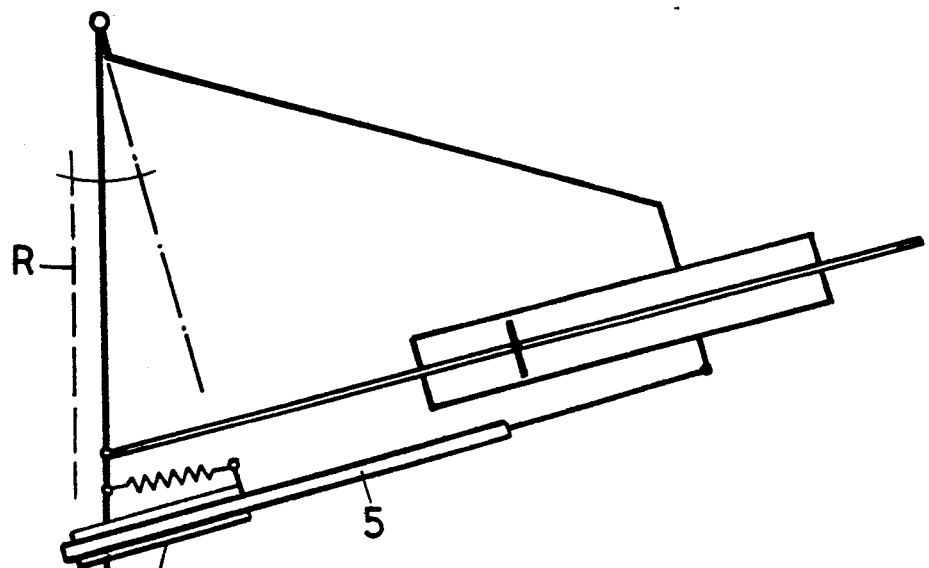
FIG.:4
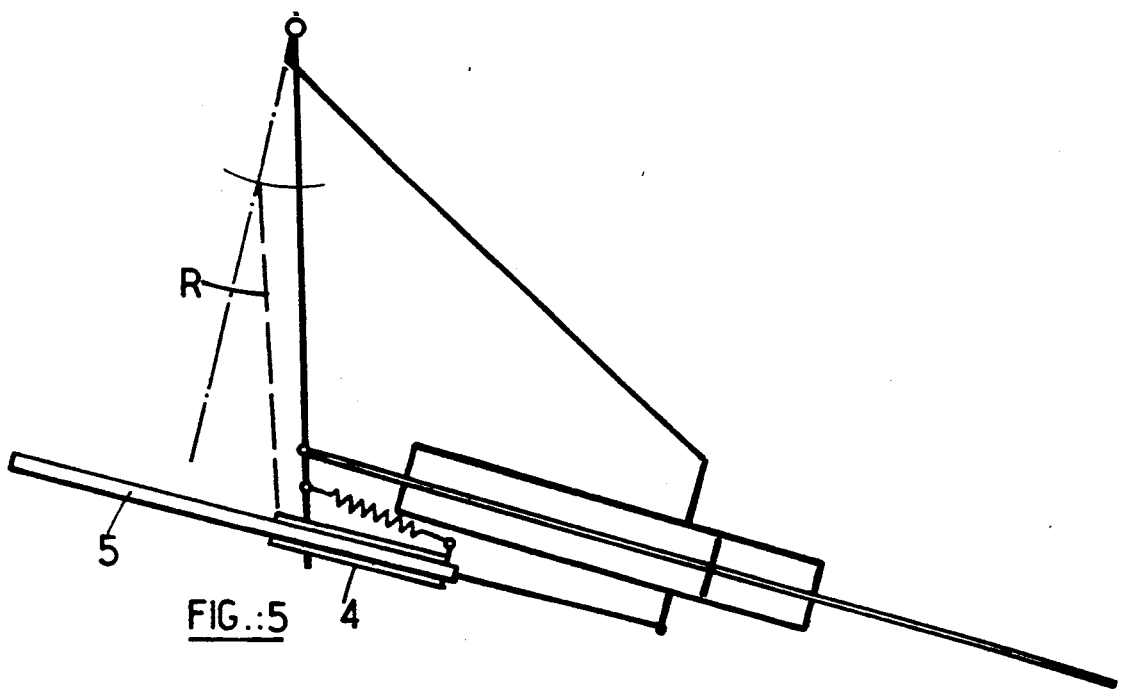
FIG.:5

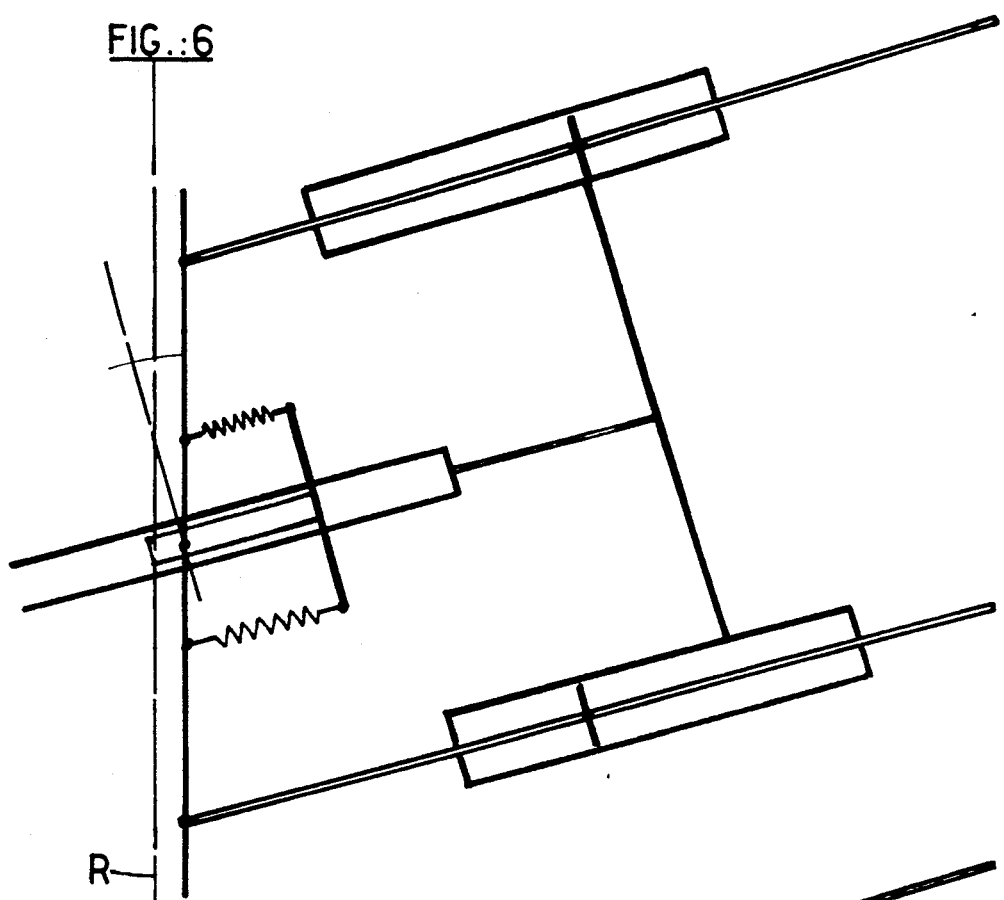
FIG.:6
R
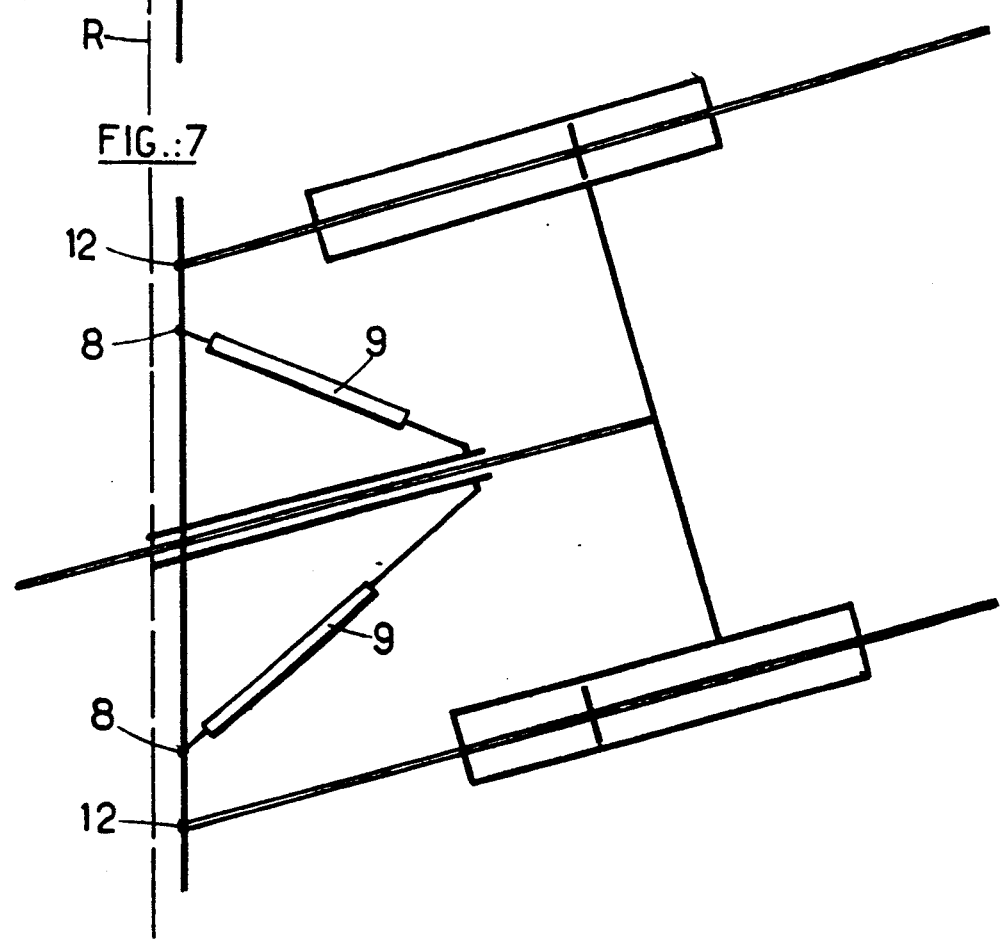
FIG.:7
12
8
9
9
8
12

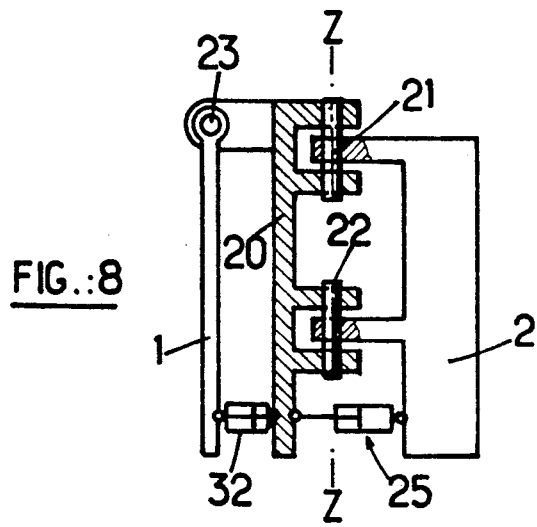
FIG.:8
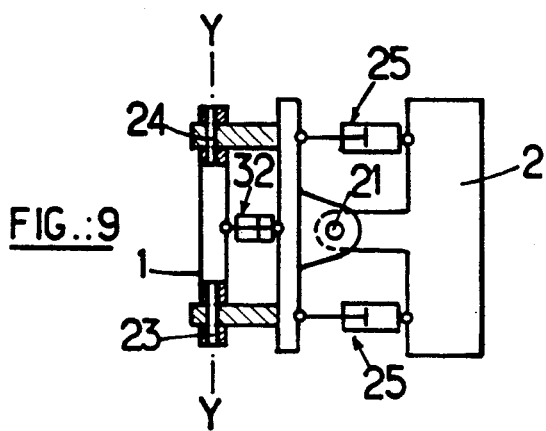
FIG.:9
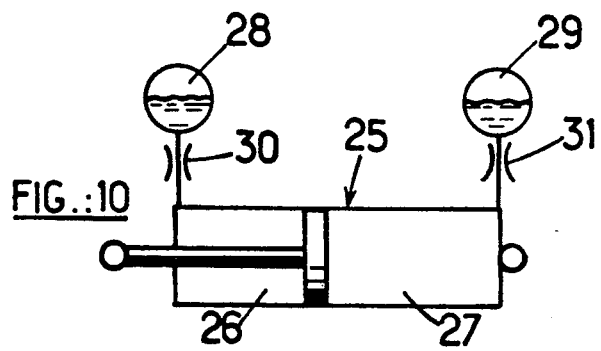
FIG.:10
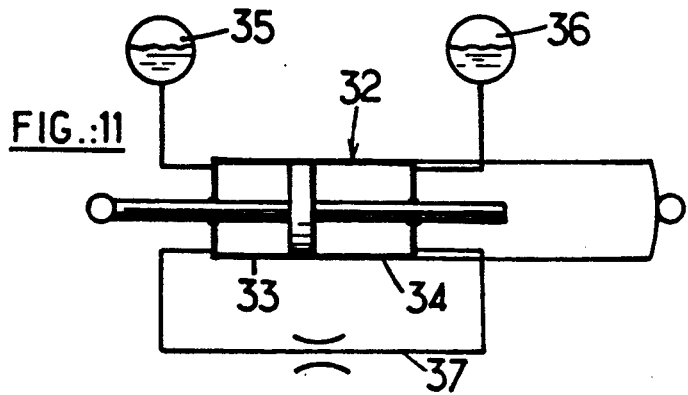
FIG.:11

APPARATUS FOR TREATING SOIL OR VEGETATION, COMPRISING A BOOM WHICH CAN PIVOT IN RELATION TO LONGITUDINAL AND TRANSVERSE AXES

BACKGROUND OF THE INVENTION

The present invention relates to an apparatus for treating soil or vegetation, and which includes a carrier vehicle equipped with a support frame that is stationary in relation to the vehicle, and a boom equipped with means for treating the soil or vegetation and disposed substantially according to a disposition parallel to the soil and perpendicular to the direction of travel of the vehicle.

The phrase treatment of the soil or of the vegetation is meant to include the entire range of agricultural techniques including, for example, sowing operations.

The development of agricultural techniques has led to a significant increase in the size of the booms of spraying or other apparatuses, it being possible for the length of this boom to reach 40 meters. Various problems result from this large size and from the fact that, on the one hand, the vehicle does not move over a soil which is horizontal in its entirety and that, on the other hand, local irregularities in the surface of the soil cause the vehicle, during its motion, to be perturbed by abrupt movements which can be considered as pivoting movements about an axis parallel to the direction of travel, which direction will be called hereinafter "longitudinal", about an axis along a direction perpendicular to the surface of the soil, which will be called hereinafter "vertical direction" and about an axis having a direction parallel to the surface of the soil and perpendicular to the direction of the travel, which will be called hereinafter "transverse direction".

The most irksome movements are pivoting movements about the longitudinal axis, and there have been known for a long time suspensions, for example of the "swinging" type or of the "rocker link" type, "having rocker links" which enable the boom to be maintained parallel to the surface of the soil during the abrupt movements of the vehicle about the longitudinal axis. Such suspensions are often associated with manual- or automatic-control adjustment means intended for fixing the best height of the boom, as far as its extremities, above the surface of the soil in such a way as to reduce the risk of one of the extremities of the boom coming into contact with the soil and running the risk of being damaged.

Work carried out for limiting the consequences of pivoting movements about a vertical axis, or "yawing", and about a transverse axis, or "pitching", has been much more limited. A yawing movement creates little risk of damaging the boom by contact with the soil but, on the other hand, it can lead, at the extremities of the boom, to over-concentrations or under-concentrations of the treatment product spread over the soil, for example. Furthermore, it causes significant forces to be experienced by the articulations which connect together successive sections of the boom and by the means for maintaining these sections in alignment.

A pitching movement can have similar consequences because the boom, no longer being maintained in a vertical plane, tilts due to its weight and to its flexibility forwards or backwards, which can also lead to over-concentrations and under-concentrations of the treatment product and to excessive flexural and torsional forces at the location of the linkages between the successive sections of the boom. Moreover, if the soil rises and falls in the direction of the path of the vehicle or, alternatively, when the carrier vehicle abruptly accelerates or decelerates, there can result from this an abnormal loading of the structure of the boom which is made to bend due to its weight and to its flexibility, in the manner mentioned hereinabove. In order to avoid the risks of breakage, provision is made for increasing the ability of the boom to withstand the flexural and torsional forces, leading to an undesirable increase in its weight and its cost.

It would be possible to envisage overcoming these drawbacks simply by replacing, in conventional so-called swinging suspensions, the longitudinal-axis articulations by ball joints permitting motion in all directions. In fact, this solution is inoperable because the extent of the angular motions which can be tolerated and which have to be compensated for is not the same about the longitudinal, transverse or vertical axes.

As regards limiting the consequences of yawing, it is possible to mention U.S. Pat. No. 4,998,025 to PATTERSON ET AL., which describes a device in which the boom is connected to the vehicle by the agency of a vertical torsion bar, which permits yawing oscillations about a vertical axis whilst providing a force for returning to the situation where the boom is in a transverse plane. The torsion bar is connected to a longitudinal pivot joint, which permits oscillations about the longitudinal axis. Damping means are provided.

In French Patent Application No. 2,559,686 to H. DELCLUSE, the torsion bar of PATTERSON ET AL. is replaced by a vertical pivot joint with elastic return means.

As regards limiting the effects of pitching, the applicant's previous U.S. Pat. No. 4,561,,591 provides for the boom to be suspended by a ball joint to a support linked to the chassis and for rolling surfaces and rollers to permit pivoting movements about a longitudinal axis. In addition, the rollers can move away from the rolling surfaces, which enables the boom to pivot about a transverse axis passing through the center of the ball joint, only in one direction. Elastic means are provided for bringing the rollers back into contact with the rolling surfaces. This disposition therefore leads only to a partial solution of the problem.

The object of the present invention is to provide an apparatus which effectively avoids the drawbacks mentioned hereinabove whilst keeping, of course, the benefit of the "swinging-", "rocker link-" or other-type suspensions of the prior art, with low-cost and robust equipment.

SUMMARY OF THE INVENTION

The invention provides, in order to obtain this result, an apparatus for treating soil or vegetation, comprising a carrier vehicle equipped with a support frame stationary in relation to the vehicle, a boom equipped with means for treating the soil or the vegetation and disposed substantially according to a disposition parallel to the soil and perpendicular to the direction of travel of the vehicle, and a suspension placed between the boom and the stationary support frame, and comprising compensation means capable of compensating for the rapid angular motions of the vehicle about a longitudinal axis in order to bring the boom back to a mean position, and in order to fix this mean position, being distinguished in that the suspension comprises a movable support frame placed between the compensation means and the stationary support frame, this movable support frame being connected to the stationary support frame via means which permit pivoting movement about a transverse axis, and in that the center of gravity of the assembly constituted by the movable support frame, the compensation means and the boom is located, at rest, below the transverse axis, such that the weight and the inertia of the assembly tend to bring the center of gravity into a plane vertical or parallel to the resultant of the forces which are exerted on the assembly and passing through the transverse axis.

Thus, a kind of "swinging" suspension is produced which causes the boom to oscillate not about a longitudinal axis, as in the prior art, but about a transverse axis, with the advantages of a conventional-type longitudinal-axis swinging suspension or of a rocker link suspension oscillating about longitudinal axes of the prior art being kept, of course.

Preferably, there is furthermore provided elastic means capable of bringing the center of gravity of the assembly back into the noted plane vertical or parallel to the resultant of the forces when it has moved away from it by means of a rapid motion. This disposition corresponds to the fact that there exist two types of possible causes for pivoting of the assembly about the transverse axis: an acceleration or an abrupt braking of the carrier vehicle or, in addition, an abrupt change in the attitude of this vehicle due to a soil irregularity, leading to a rapid motion. A progressive change in the slope along the path of the vehicle, by contrast, leads to a slow motion. The first type of motion, if it is not compensated for by elastic means, can lead to excessive and undesirable oscillations of amplitude.

Preferably too, means are provided for damping the pivoting movements of the assembly about the transverse axis.

According to a preferred embodiment, the elastic means are combined with the above-mentioned damping means by providing, between an element linked to the carrier vehicle, for example the stationary support frame, and the movable support frame, at least one double-rod actuating cylinder, the two chambers of which are each connected to a vessel containing a pressurized gas, the two chambers being furthermore connected to each other via a calibrated restrictor.

According to an advantageous embodiment, the means connecting the movable support frame to the stationary support frame furthermore permit pivoting about a vertical axis and elastic means, preferably associated with dampers, are provided between the movable support frame and the stationary support frame or the carrier vehicle, these means being disposed in order to bring a reference plane linked to the boom back into a transverse orientation when it has moved away from it.

In addition to the compensation for the non-verticality of the boom, this produces the compensation for the "flapping" phenomena due, in particular, to the fact that the trajectory of the carrier vehicle is not completely rectilinear.

Advantageously, the elastic means associated with dampers comprise at least one actuating cylinder, the two chambers of which are each connected to a vessel containing a pressurized gas.

According to a preferred embodiment, the linkage means between the stationary support frame and the movable support frame comprise a ball joint permitting pivoting movements about the two coincident axes.

Advantageously, a part attached by a ball joint or a pivot joint to the movable support frame is obliged to move in a longitudinal direction and the elastic return means tend to bring the movable support frame back into a constant position in relation to this part by pivoting movement about the vertical axis.

It will be noted that the use of a ball joint enables the costs to be reduced, but it is possible to provide a different structure with an intermediate part connected to the stationary support frame via a vertical-axis or transverse-axis pivot joint and to the movable support frame via a transverse-axis or vertical-axis pivot joint, the axes of both these pivot joints meeting at a same point or otherwise.

BRIEF DESCRIPTION OF THE DRAWINGS

The invention will be explained in more detail with the aid of the figures in which:

FIG. 1A is an overall diagrammatic view, from the rear, of a vehicle equipped with the device of the invention.

FIG. 1 is a perspective diagram of a portion of the device according to the invention.

FIG. 2 is a diagrammatic side view of the same device.

FIG. 3 is a diagrammatic plan view of the same device.

FIG. 4 and 5 are side views of the device, illustrating the attitude when the path of the vehicle is rising or falling, respectively.

FIG. 6 is a diagrammatic view of the device during a yawing movement of the vehicle.

FIG. 7 is a diagrammatic view, corresponding to FIG. 6 and illustrating a manufacturing variant.

FIG. 8 is a detailed side view, in cross section, of another embodiment in accordance with the invention.

FIG. 9 is a plan view of the embodiment of FIG. 8.

FIGS. 10 and 11 are diagrammatic views of the actuating cylinders utilized in the embodiment of FIGS. 8 and 9.

DETAILED DESCRIPTION OF THE EMBODIMENTS IN ACCORDANCE WITH THE INVENTION

The figures show a movable support frame 1, symbolized in the form of a vertical triangle and which carries, by the agency of a swinging or rocker link suspensions of known type, not shown, a spray boom R. The movable support frame 1 is, at rest, in a vertical plane. It is connected to the stationary support frame, represented diagrammatically by a bar 2, by the agency of a ball joint 3, which permits movements about a transverse axis YY and about a vertical axis ZZ. The ball joint 3 is situated, at rest, vertically in line with the center of gravity of the assembly formed by the movable support frame 1, by the boom R and by the suspension which connects them. Movements of the frame 1 in relation to a transverse axis would in principle be permitted by the ball joint 3, but they are prevented by an anti-roll device constituted by a slide 4, attached by a ball joint to the movable support frame 1 and which moves between two slideways 5 which are solidly connected to the carrier vehicle V, and therefore to the stationary chassis 2, and are longitudinally directed.

The ball joint 3 can be replaced by two articulations, having a vertical and a transverse axis respectively, both situated vertically in line with the center of gravity of the movable support frame/boom/suspension assembly and above this center of gravity.

Another anti-roll device, for example constituted from an appropriate rod-linkage system, could be utilized, the essential point being that the movable support frame 1 does not oscillate about a longitudinal axis. It will be recalled that the longitudinal oscillations are taken up by the conventional swinging or rocker link system situated between the boom and the movable support frame 1. One of the extremities of the slide 4 is solidly connected to the movable support frame 1. The other extremity of this slide is connected by the agency of a transverse linkage rod 6 and of two springs 7 to two points 8 of the movable support frame, which points are situated approximately in the horizontal plane of the slide 4 but away from the vertical plane of the latter. The linkage rod 6 and the springs 7 constitute a return device which brings the plane of the movable support frame 1 back into a transverse direction when it has moved away by pivoting movement about the vertical axis ZZ, as is clearly seen in FIG. 6.

In the variant shown in FIG. 7, the linkage rod 6 and the two springs 7 are replaced by springs 9 disposed obliquely between the extremity of the slide 4 and the points 8 of the movable support frame. The springs 7, 9 are advantageously pneumatic springs.

The position of the points 8 on the movable support frame can vary, provided they are on either side of the axis ZZ.

Dampers 10, formed from double-rod actuating cylinders, that is to say in which the internal pressure tends not to move the piston in one direction or in the other, and which comprise a restricted passage 11 connecting the two chambers, are placed between the carrier vehicle, not shown, or the fixed support frame 2, and points 12 of the movable support frame which are separated from each other in the horizontal direction. These actuating cylinders are intended to dampen the oscillation movements of the movable support frame, on the one hand, about the transverse axis YY and, in this case, the two dampers both act in the same direction, as shown in FIGS. 4 and 5, and also in the case of pivoting movements about the vertical axis ZZ, that is to say during yawing movements, as indicated in FIGS. 6 and 7. In this case, the two dampers each act in opposite directions.

The position of the points 12 can vary provided they are on either side of the vertical axis ZZ and away from the transverse axis YY.

The disposition which has just been described has the following effects: during a yawing movement, that is to say of pivoting movement about a vertical axis, the movable frame 1, and consequently the boom, are automatically brought back, by damped oscillations, into a transverse direction in relation to the overall direction of motion of the vehicle. Due to the weight of the movable support frame carrying the boom, the center of gravity of the assembly formed by the boom and by the movable support frame tending constantly to come vertically in line with the ball joint 3 which is placed above this center of gravity, the boom always tends to be placed in a vertical plane, either after a more or less rapid pitching movement or when the vehicle follows a rising or falling path.

It is seen that the movable support frame is oriented in relation to the vehicle in the direction of the pivoting movement about a vertical axis and in relation to the vertical of the place during a pivoting movement about a transverse axis.

Optimum efficiency from the spray boom is thus obtained.

An apparatus has been described hereinabove where the movable support frame automatically comes back to its mean position due to the springs 7 or 9, for pivoting movements about the vertical axis, or due to its weight for pivoting movements about the transverse axis. It is possible to act on the damping by modifying the characteristics of the restrictor 11 of the actuating cylinders.

It is also possible to utilize active automatic mechanisms for the controlling of the movable support frame.

For example, it is possible to counteract the flapping by placing an accelerometer at each boom extremity. A difference in acceleration, by the agency of an electronic device, acts on two servo valves which control the actuating cylinders.

In a second example, which can be combined with the first, a slope measurement (pendulum, level) also acts on the servo valves in order to place the boom back in a vertical plane.

FIGS. 8 and 9 show an embodiment in which the ball joint 3 is replaced by an assembly comprising an intermediate part 20 which is connected to the stationary support frame 2 via an articulation having a vertical axis ZZ and constituted by two coaxial pivot joints 21, 22. The intermediate part 20 is connected to the movable support frame 1 via an articulation having a transverse axis YY and constituted by two coaxial pivot joints 23, 24, it being possible for the articulations 21, 22 and 23, 24 to be changed around.

The slide 4 and the slideways 5 can be eliminated because the articulations only permit pivoting movements about the axes YY and ZZ.

Two stabilizing actuating cylinders 25 are mounted between the stationary support frame 2 and the intermediate part 20. Their structure is shown diagrammatically in FIG. 9. A cylindrical vessel filled with liquid is divided by the piston into two chambers 26, 27 each connected to a vessel 28, 29 containing a gas separated from the liquid by means of a diaphragm. The pipes 30, 31, which connect the chambers 26, 27 to the vessels 28, 29, have a restricted cross section. It can be seen that the assembly acts as a spring associated with a damper in order to bring the intermediate part 20, and consequently the boom, back into a transverse position in relation to the carrier vehicle when the boom has moved away from it.

An actuating cylinder 32 of another type is placed between the intermediate part 2 and the movable support frame 1. This actuating cylinder, filled with liquid, is divided into two chambers 33, 34 by a double-rod piston. The two chambers 33, 34 are each connected to a vessel 35, 36 containing a gas separated from the liquid by means of a diaphragm. A pipe 37, which has a restrictor, furthermore connects the two chambers together. The pipe 37 has been shown outside the vessel of the actuating cylinder, but it can, of course, be replaced by a restricted passage provided in the wall-thickness of the piston.

It can be seen that the assembly behaves as a spring-damper assembly in the event of abrupt movement, but that a slow motion, due to gravity, brings the piston, and consequently the boom, into an equilibrium position independent of the attitude of the intermediate part 20 and therefore of the carrier vehicle, in relation to the vertical. The actuating cylinder 32 is, in fact, of the same type as the dampers 10 described hereinabove.

I claim:

1. An apparatus for treating soil or vegetation, comprising a carrier vehicle equipped with a support frame stationary in relation to said vehicle, said vehicle being capable of moving in a direction of travel, a boom equipped with means for treating the soil or the vegetation and disposed substantially according to a disposition parallel to the soil and perpendicular to said direction of travel of the vehicle, and a suspension placed between the boom and the stationary support frame and comprising compensation means capable of compensating for rapid angular motions of the vehicle about a longitudinal axis which is parallel to said direction of travel in order to bring the boom back to a mean position and to fix said mean position, wherein said suspension comprises a movable support frame placed between said compensation means and the stationary support frame, this movable support frame being connected to the stationary support frame via means which permit pivoting movement about a transverse axis, and a center of gravity of the assembly constituted by the movable support frame, the compensation means and the boom is located, at rest, below said transverse axis, said assembly providing a weight and inertia such that said center of gravity tends to return into a plane parallel to a resultant of forces which are exerted on said assembly and which pass through said transverse axis.

2. The apparatus of claim 1, further comprising elastic means capable of bringing the center of gravity of the assembly back into said plane parallel to the resultant of the forces when it has moved away from said plane by means of rapid motion.

3. The apparatus of claim 1, further comprising means for damping pivoting movements of said assembly about said axis.

4. The apparatus of claim 2 in which said elastic means comprise, between an element linked to the carrier vehicle and the movable support frame, at least one double-rod actuating cylinder, the two chambers of which are each connected to a vessel containing a pressurized gas, the two chambers being furthermore connected to each other via a calibrated restrictor.

5. The apparatus of claim 1, in which the means connecting the movable support frame to the stationary support frame furthermore permit pivoting about a vertical axis and elastic means are provided between the movable support frame and the stationary support frame or the carrier vehicle, these means being disposed in order to bring a reference plane linked to the boom back into a transverse orientation when it has moved away from it.

6. The apparatus of claim 5, in which said elastic means are associated with dampers.

7. The apparatus of claim 6, in which the elastic means associated with dampers comprise at least one actuating cylinder having two chambers which are each connected to a vessel containing a pressurized gas.

8. The apparatus of claim 5, in which the linkage means between the stationary support frame and the movable support frame comprise a ball joint permitting pivoting movements about the two coincident axes.

9. The apparatus of claim 8, in which a part attached by a ball joint or by a pivot joint to the movable support frame is obliged to move in a longitudinal direction, said elastic return means tending to bring the movable support frame back into a constant position in relation to said part by pivoting about the vertical axis.

* * * * *